(12) United States Patent
Mukai (10) Patent No.: US 7,891,392 B2
(45) Date of Patent: Feb. 22, 2011

(54) PNEUMATIC TIRE WITH TREAD HAVING CURVED OBLIQUE GROOVES AND CHAMFERS

(75) Inventor: Tomoyuki Mukai, Kobe (JP)

(73) Assignee: Sumitomo Rubber Industries, Ltd., Kobe (JP)

( * ) Notice: Subject to any disclaimer, the term of this patent is extended or adjusted under 35 U.S.C. 154(b) by 799 days.

(21) Appl. No.: 11/819,148

(22) Filed: Jun. 25, 2007

(65) Prior Publication Data

US 2008/0000564 A1 Jan. 3, 2008

(30) Foreign Application Priority Data

Jun. 29, 2006 (JP) .............................. 2006-180109

(51) Int. Cl.
B60C 11/03 (2006.01)
(52) U.S. Cl. ............................... 152/209.8; 152/209.15
(58) Field of Classification Search .............. 152/209.8, 152/209.15
See application file for complete search history.

(56) References Cited

U.S. PATENT DOCUMENTS

| 5,293,918 | A | * | 3/1994 | Tsuda et al. ............. 152/209.8 |
| 5,996,661 | A | * | 12/1999 | Gerresheim et al. ..... 152/209.28 |
| 6,796,350 | B1 | | 9/2004 | Gerresheim et al. |
| 2002/0139460 | A1* | | 10/2002 | Boiocchi et al. ......... 152/209.8 |
| 2005/0076985 | A1* | | 4/2005 | Colombo et al. ........ 152/209.18 |

FOREIGN PATENT DOCUMENTS

| AU | 2004278228 | * | 4/2005 |
| EP | 0 718 124 A1 | | 6/1996 |
| EP | 718124 | * | 6/1996 |
| EP | 1 029 712 A1 | | 8/2000 |
| EP | 1 120 295 A2 | | 8/2001 |
| JP | 03-204308 | * | 9/1991 |
| JP | 05-254311 | * | 10/1993 |
| JP | 2003-326917 | * | 11/2003 |
| JP | 2004-155416 A | | 6/2004 |
| JP | 2006-143040 | * | 6/2006 |
| WO | WO-2006/056238 A1 | | 6/2006 |

OTHER PUBLICATIONS

Machine translation for Japan 2006-143040 (no date).*
Machine translation for Japan 2003-326917 (no date).*

* cited by examiner

Primary Examiner—Steven D Maki
(74) Attorney, Agent, or Firm—Birch, Stewart, Kolasch & Birch, LLP (57) ABSTRACT

A pneumatic tire including a tread 2 provided with at least a pair of circumferentially continuous straight crown grooves 3 which extend on both sides of the tire equator C to provide a center land 5 between them and which comprise an inner groove 3i which lies on the inside of a vehicle when the tire is fitted to the vehicle and an outer groove 3o which is on the outside with the fitted tire, wherein a plurality of curved oblique grooves 8 are provided in the center land 5 at intervals in the circumferential direction, in which each curved oblique groove 8 extends obliquely from the inner crown circumferential groove 3i toward the outer crown circumferential groove 3o, turns at a location over the tire equator C without reaching the outer crown circumferential groove 3o, and further extends obliquely toward the inner crown circumferential groove 3i to terminate inside the tire equator C in the center land 5, and circumferentially adjacent curved oblique grooves 8 intersect each other at a location substantially on the tire equator C.

9 Claims, 9 Drawing Sheets

FIG.1

(Outside of vehicle) (Inside of vehicle)

PNEUMATIC TIRE WITH TREAD HAVING CURVED OBLIQUE GROOVES AND CHAMFERS

BACKGROUND OF THE INVENTION

The present invention relates to a pneumatic tire having good steering stability and drainage property which have been improved in good balance.

Pneumatic tires are required to have repugnant good properties, steering stability on dry asphalt roads and drainage property on wet roads. A proposal to simultaneously enhance these properties is made in JP-A-2004-155416. JP-A-2004-155416 discloses a pneumatic tire having a tread pattern wherein a sipe-like narrow circumferential groove is provided on the tire equator in a center rib extending on the tire equator. However, such a tread patter leaves room for improvement in drainage property. In order to enhance the drainage property at a tire equator location, it is conceived to provide a wide straight circumferential groove on the tire equator. However, there is a possibility that the wide straight groove would decrease the rigidity of a tread center portion to deteriorate the steering stability.

It is an object of the present invention to provide a pneumatic tire having an improved drainage property without deteriorating the steering stability.

This and other objects of the present invention will become apparent from the description hereinafter.

SUMMARY OF THE INVENTION

It has been found that the drainage property of pneumatic tires can be improved without deteriorating the steering stability when a plurality of curved oblique grooves are provided at intervals in the tire circumferential direction in a tread center portion extending between an inner crown circumferential groove which lies on the inside of a vehicle when a tire is fitted to the vehicle and an outer crown circumferential groove which is on the outside with the fitted tire, wherein each curved oblique groove extends obliquely in the same direction from the inner crown circumferential groove toward the outer crown circumferential groove, turns at a location over the tire equator without reaching the outer crown circumferential groove to delineate an arc-like curved line, and further extends obliquely in the same direction toward the inner crown circumferential groove without reaching it to terminate on an axially inner side with respect to the tire equator, and such arc-like curved oblique grooves adjacent in the circumferential direction intersect each other at a location substantially on the tire equator.

In accordance with the present invention, there is provided a pneumatic tire including a tread portion provided with at least a pair of crown circumferential grooves which extend continuously and straightly in the tire circumferential direction on both sides of the tire equator to provide a center land portion between them, wherein the pair of crown circumferential grooves comprise an inner crown circumferential groove which lies on the inside of a vehicle when a tire is fitted to the vehicle and an outer crown circumferential groove which is on the outside with the fitted tire, and a plurality of curved oblique grooves are provided in the center land portion at intervals in the tire circumferential direction, in which each curved oblique groove extends obliquely from the inner crown circumferential groove toward the outer crown circumferential groove, turns at a location over the tire equator without reaching the outer crown circumferential groove, and further extends obliquely toward the inner crown circumferential groove to terminate inside of the tire equator in the center land portion, and the curved oblique grooves adjacent in the circumferential direction intersect each other at a location substantially on the tire equator.

The center land portion of the tread has a center rib which extends continuously between the straight outer crown circumferential groove and arc portions each extending between the intersecting points of the curved oblique grooves to form a wave-like line. Preferably, the maximum width/minimum width of the center rib is from 1.4 to 1.6.

Preferably, the tread portion is provided with an outer shoulder circumferential groove extending continuously in the tire circumferential direction between the outer crown circumferential groove and an outer ground contact edge of the tread located on the outside of a vehicle when a tire is fitted to the vehicle, thereby providing an outer middle land portion between the outer shoulder circumferential groove and the outer crown circumferential groove. Further, the tread portion is provided with an inner shoulder circumferential groove extending continuously in the tire circumferential direction between the inner crown circumferential groove and an inner ground contact edge of the tread located on the inside with the fitted tire, thereby providing an inner middle land portion between the inner shoulder circumferential groove and the inner crown circumferential groove. The inner middle land portion includes a plurality of blocks defined by lateral grooves.

Preferably, the lateral grooves provided in the inner middle land portion have a width gradually decreasing toward the tire equator.

Preferably, the outer middle land portion is in the form of a rib extending continuously in the tire circumferential direction.

Preferably, the circumferentially extending edges of each of the outer and inner middle land portions have chamfers. In other words, a corner formed between the ground contact surface of each of the outer and inner middle land portions and the axially outer wall of each of the crown circumferential grooves, and a corner formed between the ground contact surface of each of the outer and inner middle land portions and the axially inner wall of each of the shoulder circumferential grooves, are chamfered. Preferably, the axial width of the chamfers of the outer middle land portion is larger than the axial width of the chamfers of the inner middle land portion.

Preferably, the inner shoulder circumferential groove extends circumferentially in a zigzag form having an amplitude of 0.5 to 2.0 mm.

Since the pneumatic tire of the present invention having a tread pattern as mentioned above have, at a tire equator location at which the ground contact pressure is high, oblique grooves each of which extends from the intersecting point of the oblique grooves intersecting each other substantially on the tire equator, toward both the inside and the outside of a car, a high water drainage effect can be achieved by the oblique grooves. Further, since no groove which circumferentially extends on the tire equator is provided, the rigidity of a tread center portion is not lowered, so deterioration of the steering stability can be prevented.

DETAILED DESCRIPTION OF THE INVENTION

An embodiment of the present invention will now be explained with reference to the accompanying drawings.

The pneumatic tire (the entire being not shown) of the present invention as shown in this embodiment is suitable for use in summer as a tire for passenger cars. The pneumatic tire has an asymmetric tread pattern that an inner half pattern TPi with respect to the tire equator C which is located inside of a vehicle when the tire is attached to the vehicle and an outer half pattern TPo with respect to the tire equator C which is located outside of the vehicle when the tire is attached to the vehicle are asymmetrically formed (line asymmetry and point asymmetry). A mark such as "INSIDE" and/or "OUTSIDE" may be put on a sidewall or the like of the tire according to the present invention in order to indicate the direction of attaching the tire to a vehicle.

Figure 1:
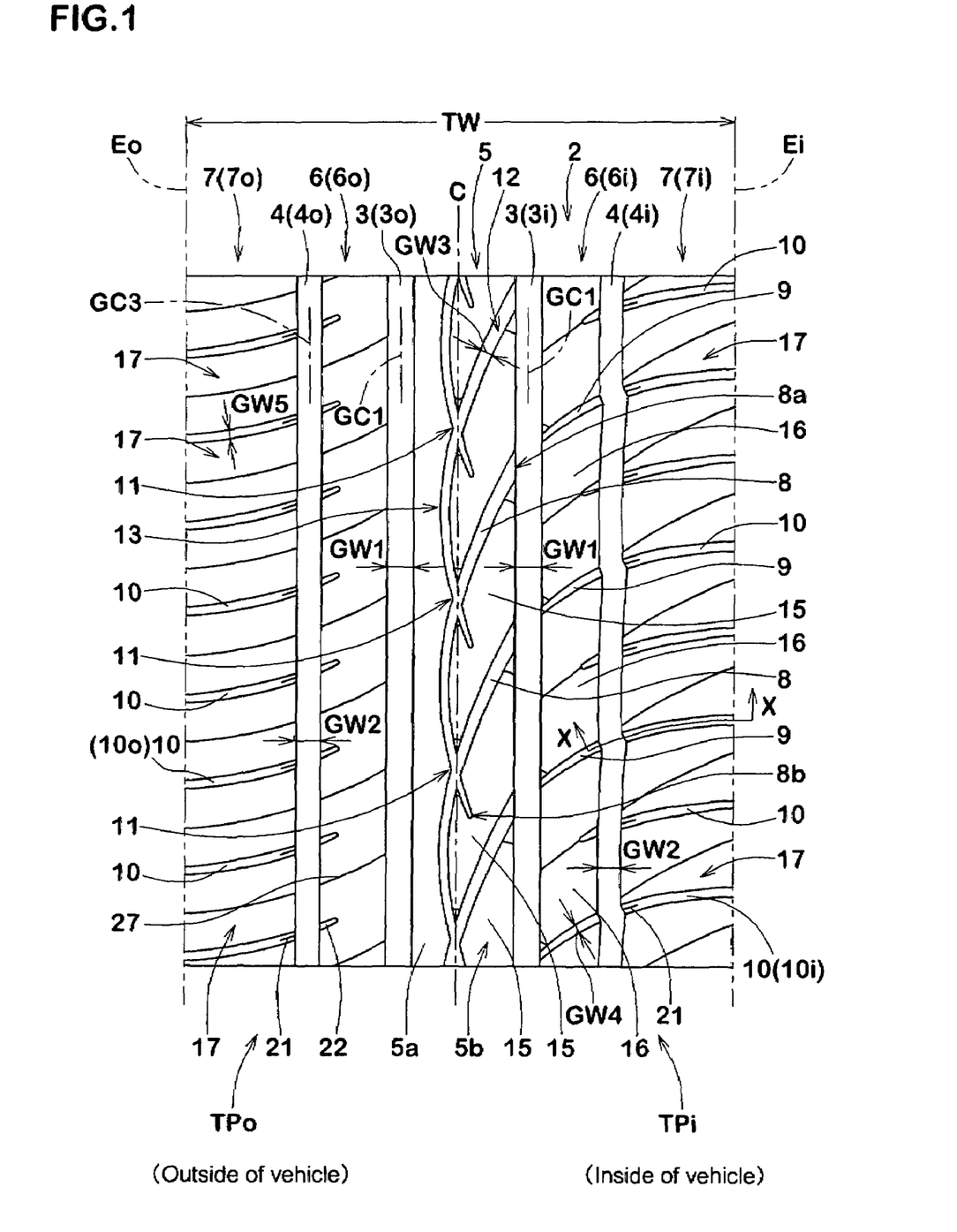
FIG. 1 is a plan view of a development of the tread portion of a pneumatic according to an embodiment of the present invention.
Figure 2:
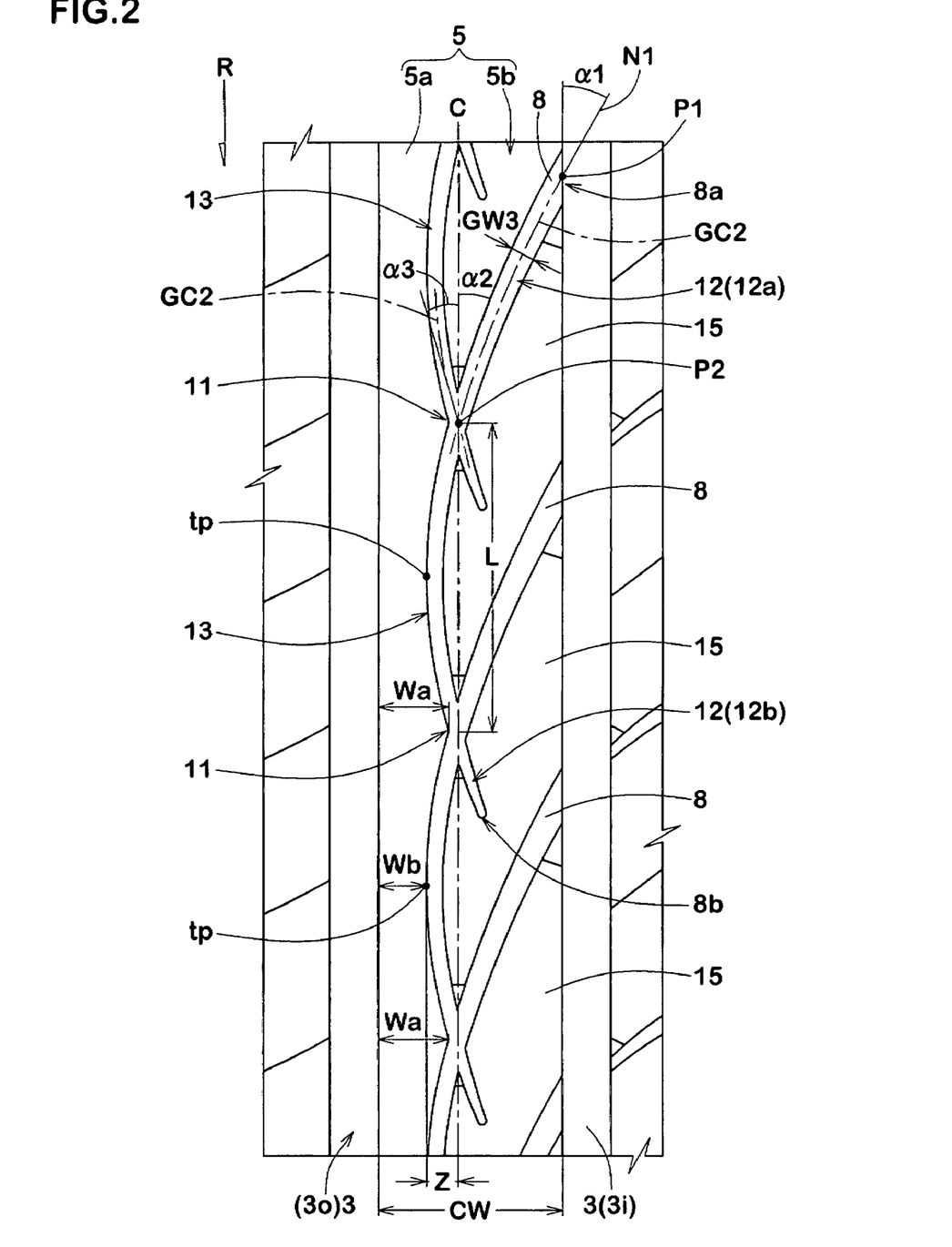
FIG. 2 is an enlarged view of a part of FIG. 1.

FIG. 1 shows a development of a tread portion 2 of a tire according to an embodiment of the present invention, and FIG. 2 shows an enlarged view of a part of FIG. 1. The tread portion 2 is provided with a pair of straight crown circumferential grooves 3 which extend continuously in the tire circumferential direction on both sides of the tire equator C, and a pair of shoulder circumferential grooves 4 which are disposed axially outside of the crown circumferential grooves 3 and extend continuously in the tire circumferential direction, whereby on the tread portion 2 are defined a center land portion 5 which circumferentially extends between the crown circumferential grooves 3, 3, a pair of middle land portions 6 which circumferentially extend between the crown circumferential groove 3 and the shoulder circumferential groove 4, and a pair of shoulder land portions 7 which circumferentially extend between the shoulder circumferential groove 4 and a tread ground contact edge Ei or Eo.

The crown circumferential grooves 3 straightly extend on both sides of and in the vicinity of the tire equator C at which the ground contact pressure is high. The crown circumferential grooves 3 serve to exhibit a high water drainage property. In view of exhibiting a high drainage property, it is preferable that the groove width GW1 of the crown circumferential grooves 3 is 3.5% or more, especially 4.0% or more, of a tread width TW, and the groove depth of the crown circumferential grooves 3 is 6.0 mm or more, especially 7.0 mm or more. On the other hand, if the groove width GW1 of the crown circumferential grooves 3 is too large, the pattern rigidity in the vicinity of the tire equator C tends to be remarkably decreased to deteriorate the steering stability. Therefore, it is preferable that the groove width GW1 of the crown circumferential grooves 3 is 6.5% or less, especially 6.0% or less, of the tread width TW, and the groove depth of the crown circumferential grooves 3 is 10.0 mm or less, especially 9.0 mm or less.

The term "tread width" as used herein means an axial distance between the tread ground contact edges, i.e., inner ground contact edge Ei which lies on the inside of a vehicle when a tire is fitted to the vehicle, and outer ground contact edge Eo which lies on the outside of the vehicle with the fitted tire. The tread ground contact edges Ei and Eo denote ground contact edges of a tire at the time when the tire is in the standard state that the tire is mounted on a standard rim and inflated to a standard pressure and no load is applied to the tire, and the tread portion 2 of such a tire is then brought into contact with a plane surface at a camber angle of 0° by applying a load of 88% of the standard load. By the way, the dimensions of respective parts or portions of the tread portion 2 denote values in the standard state, unless otherwise noted.

The term "standard rim" as used herein means a rim defined for every tire in a standardizing system on which the tire is based and, for example, denotes "standard rim" in JATMA, "design rim" in TRA and "measuring rim" in ETRTO. Also, the term "standard pressure" as used herein means an air pressure defined for every tire in the standardizing system and, for example, denotes the "maximum air pressure" in JATMA, the maximum value recited in the table of "Tire Load Limits at Various Cold Inflation Pressures" in TRA, and the "inflation pressure" in ETRTO, provided that in case of tires for passenger cars, the "standard pressure" is 180 kPa. Further, the term "standard load" as used herein means a load defined for every tire in the standardizing system and, for example, denotes the "maximum load capacity" in JATMA, the maximum value recited in the table of "Tire Load Limits at Various Cold Inflation Pressures" in TRA, and the "load capacity" in ETRTO.

The crown circumferential grooves 3 comprise an inner crown circumferential groove 3i disposed in the inner half tread pattern TPi, and an outer crown circumferential groove 3o disposed in the outer half tread pattern TPo. These crown grooves 3i and 3o may be disposed, for example, at locations which are line-symmetric with respect to the tire equator C, or at locations which are line-asymmetric with respect to the tire equator C.

In view of preventing decrease in rigidity of the center land portion 5, it is preferable that the axial distance between a groove center line GC1 of the crown circumferential groove 3 and the tire equator C is 5% or more, especially 6% or more, of the tread width TW and is, as to its upper limit, 17% or less, especially 16% or less, of the tread width TW. More preferably, the locations of the crown circumferential grooves 3 are determined so that the axial width CW (shown in FIG. 2) of the center land portion 5 is from 15 to 18% of the tread width TW.

A plurality of curved oblique grooves 8 are provided in the center land portion 5 at intervals in the tire circumferential direction. Each of the curved oblique grooves 8 is made in the form of a smooth arc-like curved line such that its groove center line GC2 (shown in FIG. 2) is convex toward the outside of a vehicle. One end 8a of an arc-like curved oblique groove 8 opens into the inner crown circumferential groove 3i. The arc-like oblique groove 8 extends obliquely in the center land portion 5 from the one end 8a (starting end) toward the outer crown circumferential groove 3o, turns at a location crossing over the tire equator C toward the vehicle outside without reaching the outer crown circumferential groove 3o (in other words, without opening into the groove 3o), and further extends obliquely toward the inner crown circumferential groove 3i over the tire equator C.

In this embodiment, the other end 8b (terminal end) of the curved oblique groove 8 terminates inside the center land portion 5 and does not open to the inner crown circumferential groove 3i. The curved oblique groove 8 includes an inner component 12 which lies in the inner half pattern TPi and an outer component 13 which lies in the outer half pattern TPo. Further, the inner component 12 includes a first inner component 12a located on the starting end 8a side, and a second inner component 12b located on the terminal end 8b side.

With respect to the curved oblique grooves 8, the expression "crossing over the tire equator C toward the vehicle outside" means that both groove edges of a curved oblique groove 8 lie outside of the tire equator C with a tire fitted to a vehicle. Similarly, the expression "extending toward the inner crown circumferential groove 3i over the tire equator C" or the like expression means that both groove edges of a curved oblique groove 8 lie inside of the tire equator C with a tire fitted to a vehicle.

An inwardly extending tip portion on the terminal end 8b side of a curved oblique groove 8 intersects an adjacent curved oblique groove 8 on the tire equator C to form an intersecting part 11, thus providing the outer component 13 extending between the adjacent two intersecting parts 11 in an arc-like manner, the first inner component 12a extending between the starting end 8a and one of the adjacent two intersecting parts 11, and the second inner component 12b extending between the other of the adjacent two intersecting parts 11 and the terminal end 8b. In other words, the curved oblique grooves 8 adjacent each other in the circumferential direction have an intersecting part 11 at a location substantially on the tire equator C at which the adjacent grooves intersect each other. One intersecting part 11 is formed per two adjacent curved oblique grooves 8. Since the curved oblique grooves 8 are disposed in the center land portion 5 in such a manner as mentioned above, the first inner component 12a of the curved oblique groove 8 extends from the intersecting part 11 toward the vehicle inside, and the outer component 13 of the curved oblique groove 8 extends from the intersecting parts 11 toward the vehicle outside, whereby smooth drainage can be achieved by utilizing a high ground contacting pressure occurring in the vicinity of the tire equator C. In particular, in case that the tire rotates in the direction R shown in FIG. 2, a V-shaped water flow starting from the intersecting part 11 is obtained by the rotation of the tire and, therefore, a water film formed in the vicinity of the tire equator C can be more effectively removed to both axial outsides of the tire.

Further, since the outer components 13 of the curved oblique grooves 8 continue in the circumferential direction through the intersecting parts 11 while each extending between the adjacent intersecting parts in a smooth arc-like manner, an effect of suppressing a columnar resonance noise which is apt to generate in a straight-line groove is obtained besides a good drainage property. Furthermore, since the intersecting parts 11 are intermittently disposed on the tire equator C and, therefore, since land portions are present on the tire equator C between the intersecting parts 11, decrease in rigidity on the tire equator C of the center land portion 5 can be prevented. Therefore, according to the pneumatic tire of the present invention, the drainage property can be improved without deteriorating the steering property.

Figure 3:
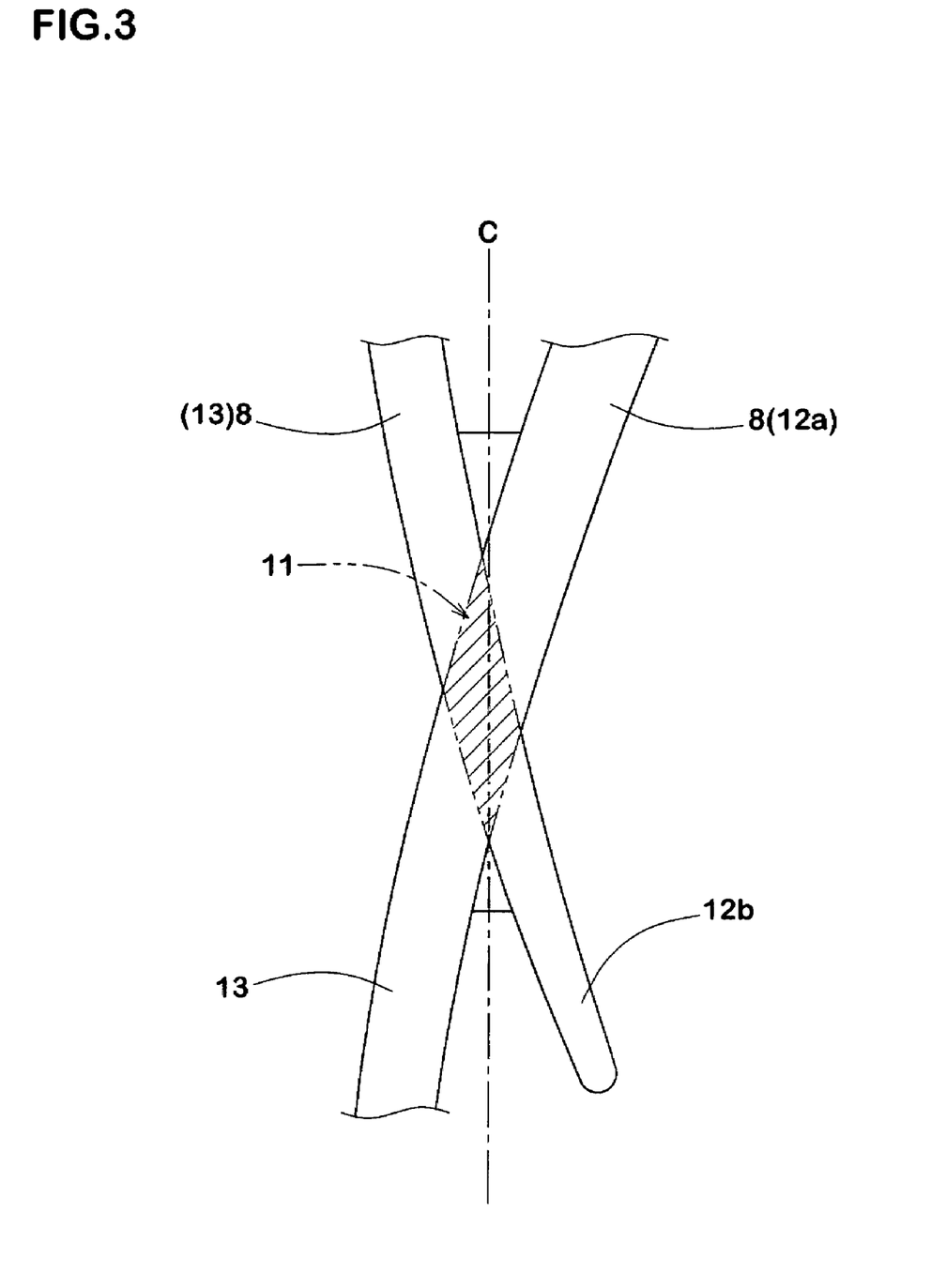
FIG. 3 is an enlarged view illustrating an intersecting portion of grooves.

The expression or a like expression such that curved oblique grooves 8 "intersect each other at a location substantially on the tire equator C" means that the tire equator C crosses the intersecting parts 11 each having an approximately rhombic shape, as shown in FIG. 3. The intersecting part 11 is defined by lines smoothly extended from both edges of each of the intersecting two curved oblique grooves 8.

An axial distance Z between the tire equator C and an outermost projecting point tp of a curved oblique groove 8 where the groove edge projects to the outermost toward the vehicle outside, as shown in FIG. 2, is not particularly limited. However, if the axial distance Z is too small, the outer component 13 of the curved oblique groove 8 excessively approaches the tire equator C, so the rigidity in the vicinity of the tire equator C tends to lower to deteriorate the steering stability. On the other hand, if the distance Z is too large, a land portion sandwiched by the outermost projecting point tp and the outer crown circumferential groove 3o tends to remarkably decrease its rigidity to invite uneven wear. From such points of view, the axial distance Z is preferably from about 15% to about 20% of an axial width CW of the center land portion 5.

The oblique angle $\alpha 1$ of the curved oblique groove 8 at its starting end 8a (that opens to the inner crown circumferential groove 3i) with respect to the circumferential direction, as shown in FIG. 2, is not particularly limited. However, from the viewpoint of effectively discharging water present in the intersecting parts 11 into the inner crown circumferential groove 3i, it is preferable that the oblique angle $\alpha 1$ of the groove 8 is 45° or less, especially 40° or less, more especially 35° or less. On the other hand, if the oblique angle $\alpha 1$ is too small, a sharp-pointed land portion defined by adjacent two curved oblique grooves 8 and the inner crown circumferential groove 3i tends to remarkably decrease its rigidity to cause uneven wear therefrom. Therefore, it is preferable that the oblique angle $\alpha 1$ of the groove 8 is 20° or more, especially 25° or more.

An angle $\alpha 2$ of the first inner component 12a at the intersecting part 11 with respect to the circumferential direction (or to the tire equator C) and an angle $\alpha 3$ of the outer component 13 at the intersecting part 11 on the terminal end side with respect to the circumferential direction are also particularly limited. However, if the angles $\alpha 2$ and $\alpha 3$ are too large, the drainage property at the center land portion tends to deteriorate, and if they are too small, the rigidity of a sharp-pointed land portion sandwiched by the first inner component 12a and the outer component 13 tends to remarkably decrease to cause uneven wear therefrom. Therefore, from such points of view, it is preferable that the angle $\alpha 2$ of the inner component 12a is 10° or more, especially 15° or more and, as to the upper limit, is 25° or less, especially 20° or less. Similarly, it is preferable that the angle $\alpha 3$ of the outer component 13 is 5° or more, especially 10° or more and, as to the upper limit, is 20° or less, especially 15° or less.

The absolute value of the angle $\alpha 2$ of the inner component 12a and the absolute value of the angle $\alpha 3$ of the outer component 13 may be the same or different from each other. In the case that the angles $\alpha 2$ and $\alpha 3$ are different from each other, it is preferable that the difference between the absolute values of these angles ($|\alpha 2|-|\alpha 3|$) is 12° or less, especially 6° or less. If the difference is excessively large, the difference in drainage resistance between the components 12a and 13 becomes large, so the drainage property at the tire equator C of discharging water from the tire equator C to axially both sides of the tire is easy to deteriorate.

The angle $\alpha 1$ as shown herein denotes an angle on an acute angle side of a tangent line N1 drawn to a groove center line GC2 of the curved oblique groove 8 at an intersecting point P1 where the groove center line GC2 intersects the axially inner edge of the inner crown circumferential groove 3i. Similarly, the angles $\alpha 2$ and $\alpha 3$ as shown herein denotes, respectively, an angle on an acute angle side of a tangent line (now shown) drawn to each of the groove center lines GC2 of two adjacent curved oblique grooves 8 at an intersecting point P2 of these groove center lines GC2 where these two adjacent grooves 8 intersect each other at the intersecting part 11.

Figure 4:
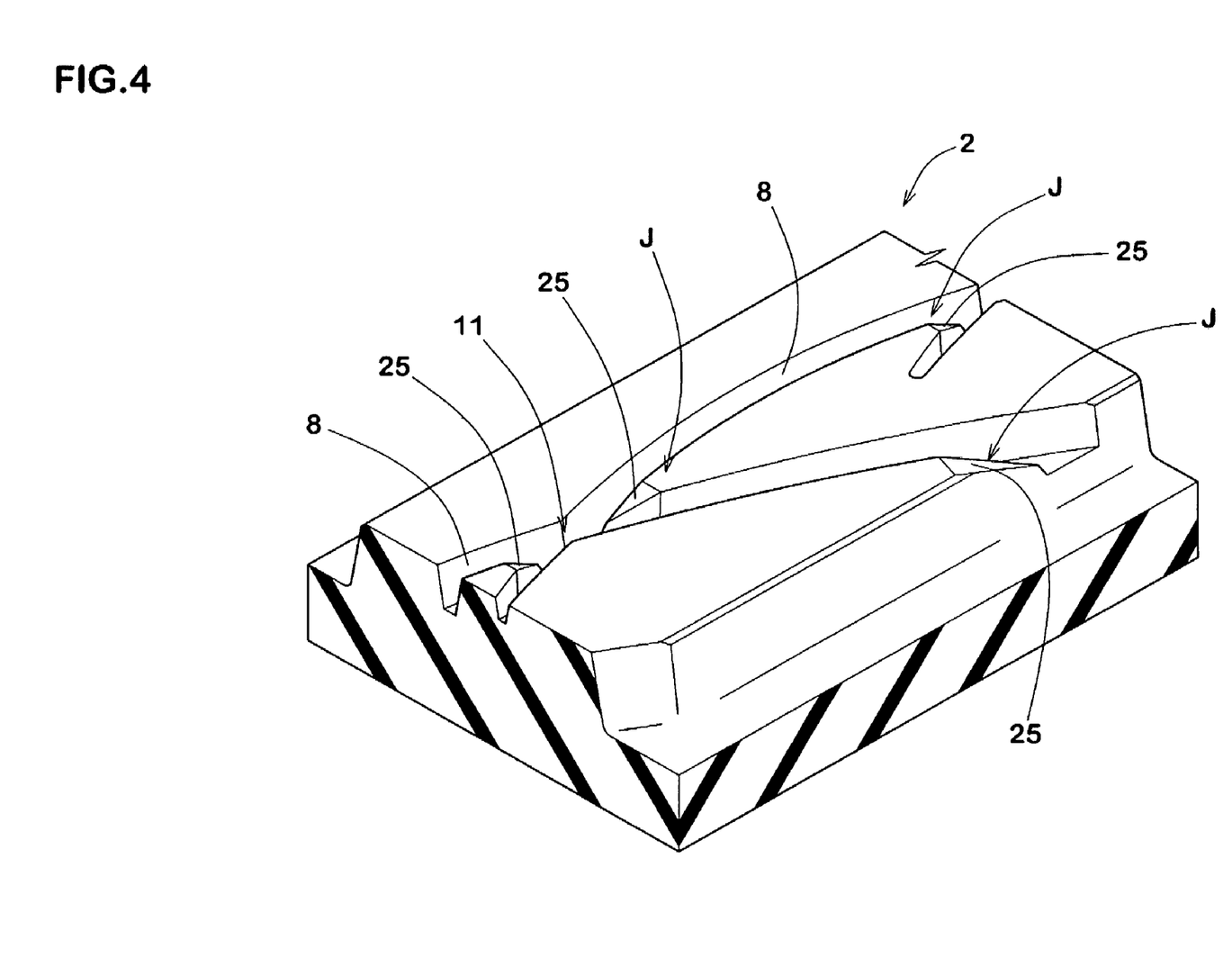
FIG. 4 is a perspective view illustrating a neighborhood of the intersecting portion of the grooves.

As shown in FIG. 4, tapered land portions J defined by grooves in the center land portion 5 may be chamfered to form chamfers 25 at which the land height decreases toward the tip thereof, whereby the rigidity of the tip portion of the tapered land portion J is secured to surely prevent uneven wear from occurring. Such prevention of uneven wear ensures a sufficient ground contact and can contribute to improvement in steering stability.

A pitch L in the circumferential direction of the intersecting parts 11, as shown in FIG. 2, is not particularly limited. However, if the pitch L is too large, the drainage property in the vicinity of the tire equator C tends to be not sufficiently enhanced, and if the pitch L is too small, the ground contact area of the center land portion 5 is decreased, so the steering stability tends to be deteriorated. Therefore, it is preferable that the pitch L of the intersecting parts 11 is at least 2.0%, especially at least 2.5%, of the length of one round of the tire equator C, and is at most 4.0%, especially at most 3.5%, of the length of one round of the tire equator C. It is particularly preferred to dispose about 29 to about 35 intersecting parts 11 per a round of the tread.

The center land portion 5 includes a center rib 5a which is defined by the outer crown circumferential groove 3o and the arc-like outer components 13 circumferentially continuing through the intersecting parts 11 and which extends continuously in the circumferential direction while repeating increase and decrease in its axial width. Such a rib 5a serves to increase the grip force to improve the stability in straight running of a vehicle, since the rib can possess a larger circumferential rigidity than a block row. Further, since the rib 5a extends continuously in the circumferential direction, the amount of deformation in the lateral direction is suppressed even in cornering, so a large lateral force can be generated.

The rigidity of the center land portion 5 is easy to lower at the intersecting parts 11. However, since a portion having the maximum axial width Wa of the center rib 5a can be disposed to be adjacent to the intersecting part 11 as shown in this embodiment, a deformation as narrowing the intersecting part 11 is effectively suppressed even at the time of action of lateral force and, therefore, deterioration of the drainage property during the cornering can be prevented. In order to surely exhibit such an action, it is preferable that the ratio of maximum width Wa to minimum width Wb (Wa/Wb ratio) of the center rib 5a is from 1.4 to 1.6.

Further, the center land portion 5 includes approximately bill-like center blocks 15 tapered toward the tire equator C side, which are disposed in the circumferential direction at intervals between the inner crown circumferential groove 3i and each outer component 13 extending between the intersecting parts 11, thus providing a block row 5b. Such a block row 5b exhibits a good drainage effect, since a water film is effectively forced out from the tire equator C and its neighborhood toward the inner crown circumferential groove 3i by a pumping action of the first inner components 12a based on ground contacting and releasing of each block 15. In the center block 15 of the tire in this embodiment, the second inner component 12b of the curved oblique groove 8 extends to cut into the block without dividing the block, whereby the rigidity of the center block 15 is moderately eased to suppress uneven wear.

The width GW3 and depth of the curved oblique groove 8 are not particularly limited. However, if the groove width and depth are too small, no sufficient drainage effect is obtained in the center land portion 5, and if they are too large, the rigidity of the center land portion 5 tends to lower to deteriorate the steering stability. Therefore, it is preferable that the groove width GW3 of the curved oblique groove 8 is 1% or more, especially 2% or more, of the tread width TW, and is 4% or less, especially 3% or less, of the tread width TW. It is also preferable that the groove depth of the curved oblique groove 8 is 3.0 mm or more, especially 3.5 mm or more, and is 8.0 mm or less, especially 7.5 mm or less. It is particularly preferable that the curved oblique groove 8 has a groove width and/or a groove depth, which gradually increase toward the inner crown circumferential groove 3i.

The shoulder circumferential groove 4 includes an outer shoulder circumferential groove 4o which extends continuously in the circumferential direction between the outer crown circumferential groove 3o and an outer ground contact edge Eo of the tread, and an inner shoulder circumferential groove 4i which extends continuously in the circumferential direction between the inner crown circumferential groove 3i and an inner ground contact edge Ei of the tread.

The outer shoulder circumferential groove 4o extends in the tire circumferential direction in a straight line manner. Between the outer shoulder circumferential groove 4o and the outer crown circumferential groove 3o is formed an outer middle land portion 6o comprising a circumferentially continuous rib.

Like this, by forming the vehicle outside middle land portion 6o where a large load is applied during cornering as a rib having a large circumferential rigidity, the steering stability can be enhanced. The term "circumferentially continuous rib" as used herein encompasses of course an embodiment wherein no lateral groove is provided therein, but means that small grooves such as narrow grooves or sipes may be disposed in the land portion 6o to divide it in the circumferential direction, so long as the small grooves do not exert a substantial influence on the rigidity of the land portion 6o. The term "small groove" means an incision or the like having a width of at most 1.2 mm and a depth of at most 75% of the depth of outer shoulder circumferential groove 4o. In this embodiment as shown in FIG. 1, the outer middle land portion 6o is provided with short lug grooves 22 having a short length and sipes 27 crossing the middle land portion 6o.

Figure 5:
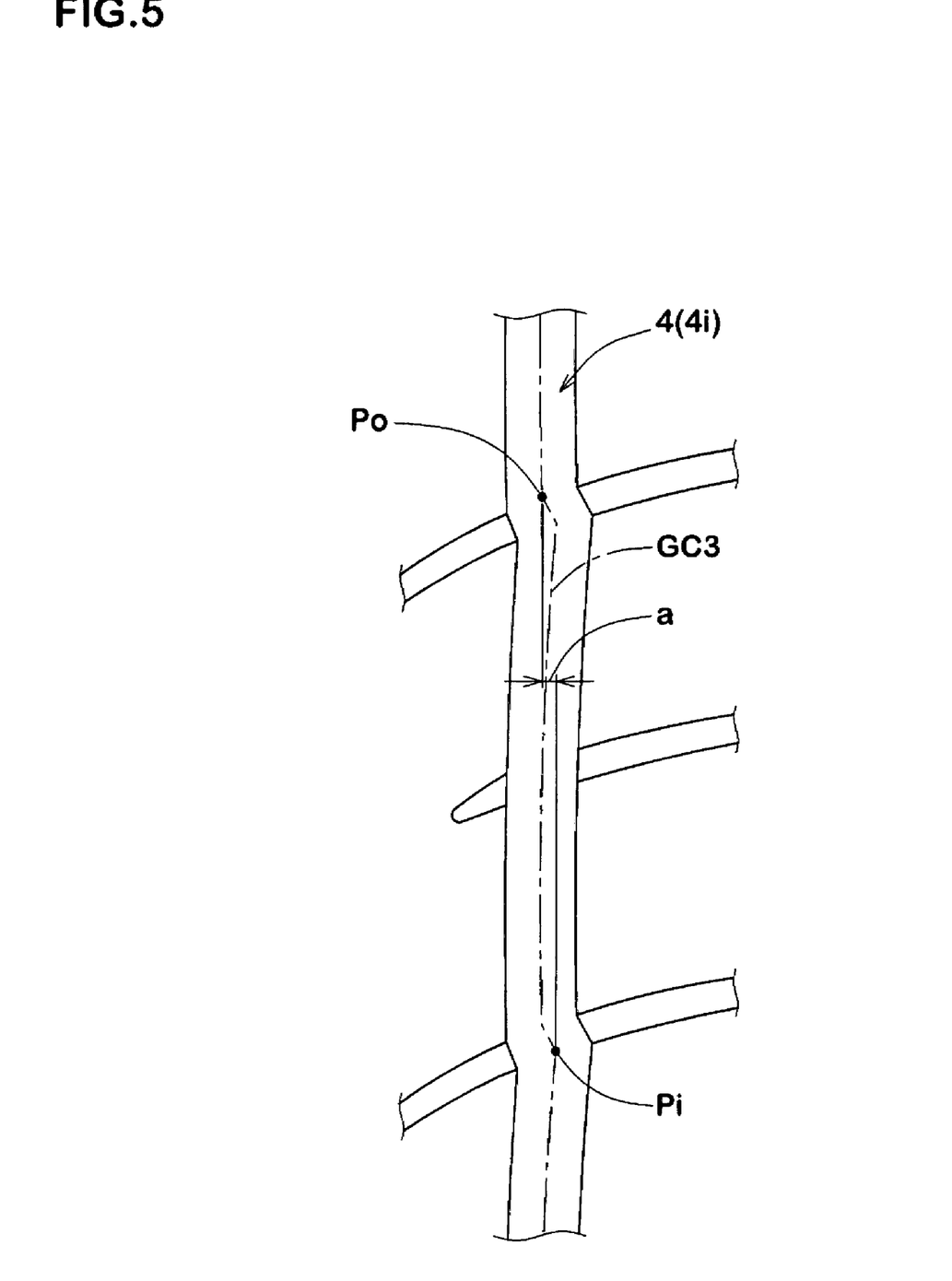
FIG. 5 is an enlarged view of an inner shoulder circumferential groove.

An inner middle land portion 6i is disposed between the inner shoulder circumferential groove 4i and the inner crown circumferential groove 3i is comprising a circumferentially continuous rib. The inner shoulder circumferential groove 4i may extend straightly in the circumferential direction like the outer shoulder circumferential groove 4o, or may extend in a zigzag form having a relatively small amplitude "a" in the axial direction as shown in FIG. 5. Such a zigzag groove does not greatly impair the rigidity of the inner middle land portion 6i when the amplitude is small, and serves to suppress a columnar resonance which is apt to generate in a straight groove to greatly decrease a traveling noise.

If the amplitude "a" of the inner shoulder circumferential groove 4i is too small, an effect of suppressing the columnar resonance is not sufficiently exhibited, and if it is too large, the rigidity of the inner middle land portion 6i tends to be decreased. Therefore, it is preferable that the amplitude "a" is 0.5 mm or more, especially 1.0 mm or more, and is 2.5 mm or less, especially 2.0, mm or less. The amplitude "a" denotes an axial distance between an outermost point Po on a groove center line GC3 of the inner shoulder circumferential groove 4i and an innermost point Pi on the groove center line GC3 with a tire fitted to a vehicle.

The width GW2 and depth of each shoulder circumferential groove 4 are not particularly limited. However, if the groove width and depth are too small, no sufficient drainage effect is obtained in shoulder portions, and if they are too large, the rigidity of shoulder land portions 7 tends to lower to deteriorate the steering stability. In particular, a larger load acts on the shoulder circumferential grooves 4 during cornering as compared with the crown circumferential grooves 3. Therefore, it is preferable that the groove width GW2 of the shoulder circumferential groove 4 is from about 3% to about 5% of the tread width TW. It is particularly preferable that the groove width GW2 is smaller than the groove depth of the crown circumferential grooves 3. As to the groove depth of the shoulder circumferential grooves 4, the depth for the crown circumferential grooves 3 is applicable. That is to say, the depth of the shoulder circumferential grooves 4 is preferably at least 6.0 mm, more preferably at least 7.0 mm, and is preferably at most 10.0 mm, more preferably at most 9.0 mm.

The inner shoulder circumferential groove 4$i$ and the outer shoulder circumferential groove 4$o$ may be disposed, for example, at locations which are line-symmetric with respect to the tire equator C, or at locations which are line-asymmetric with respect to the tire equator C.

In view of preventing decrease in rigidity of the middle land portion 6, it is preferable that the axial distance between a groove center line GC3 of the shoulder circumferential groove 4 and the tire equator C is 20% or more, especially 22% or more, of the tread width TW and is, as to its upper limit, 33% or less, especially 30% or less, of the tread width TW. In particular, it is preferable that the axial width of the outer middle land portion 6$o$ is larger than the axial width of the inner middle land portion 6$i$.

The inner middle land portion 6$i$ is provided with a plurality of middle lateral grooves 9 at intervals in the tire circumferential direction. The middle lateral grooves 9 each extends in the middle land portion 6$i$ to connect the inner crown circumferential groove 3$i$ and the inner shoulder circumferential groove 4$i$, whereby a plurality of middle blocks 16 defined by the middle lateral grooves 9 are formed in the inner middle land portion 6$i$.

In this embodiment as shown in FIG. 1, the middle lateral grooves 9 are disposed at approximately regular intervals. The circumferential interval between the adjacent grooves 9 is approximately equal to the pitch of the intersecting parts 11 of the curved oblique grooves 8. The middle lateral groove 9 obliquely extends from a location at which the lateral groove 9 is smoothly connected with the starting end 8$a$ of the curved oblique groove 8 through the inner crown circumferential groove 3$i$, to the inner shoulder circumferential groove 4$i$ in the same oblique direction as the first inner component 12$a$ of the curved oblique groove 8. Such lateral grooves 9 serve to smoothly discharge axially outwardly (to inside of vehicle) a part of water which have flowed from the curved oblique groove 8 to the inner crown circumferential groove 3$i$, whereby the wet grip performance is further enhanced.

Figure 6:
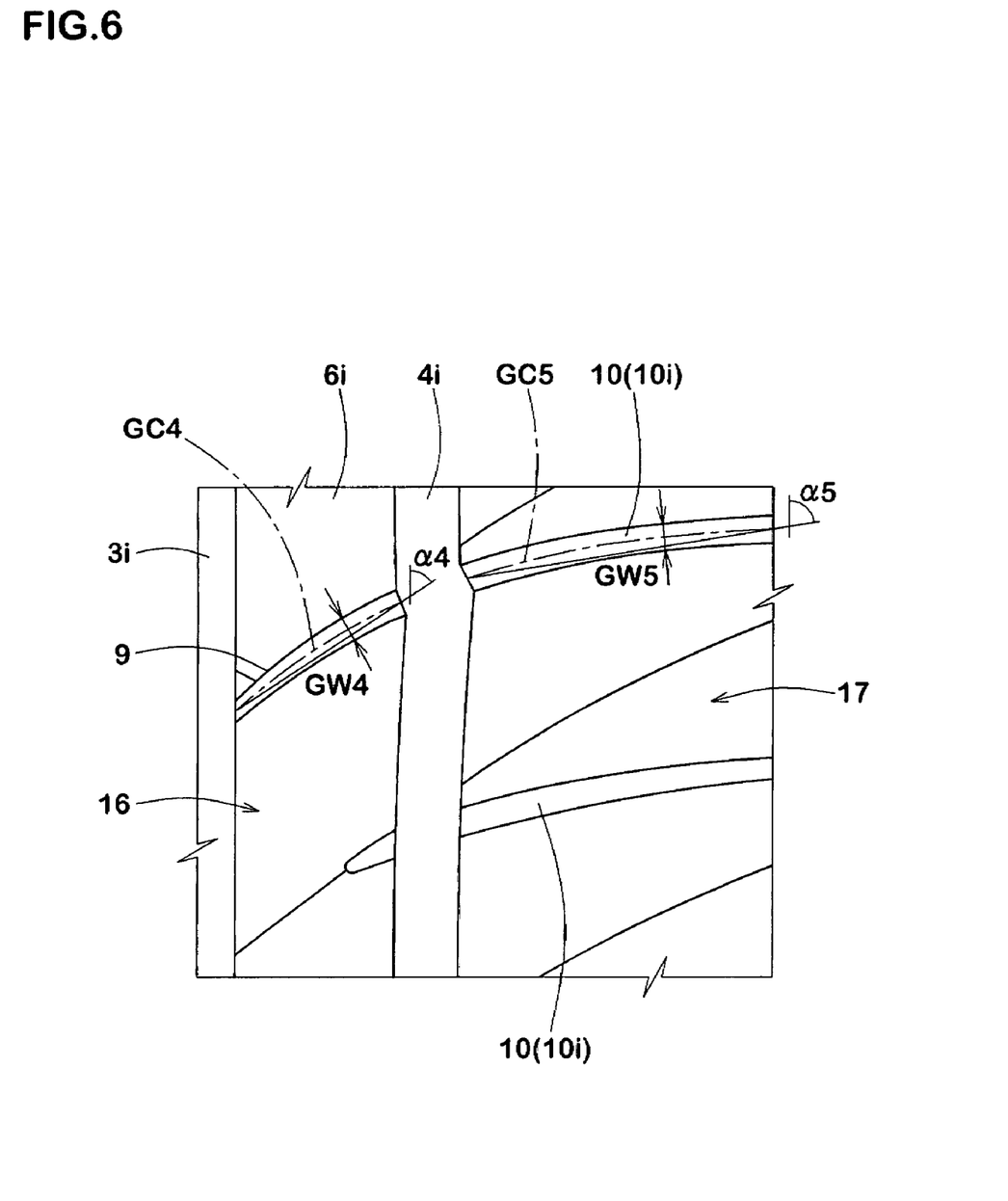
FIG. 6 is a partial enlarged view of the tread portion.

An angle $\alpha4$ of a straight line connecting the both ends of a groove center line GC4 of the middle lateral groove 9 with respect to the circumferential direction, as shown in FIG. 6, is preferably at least 45°, more preferably at least 50° and, as to the upper limit, is preferably at most 65°, more preferably at most 60°. In particular, it is preferable that the angle $\alpha4$ is larger than the angle $\alpha1$ of the curved oblique groove 8, whereby the lateral rigidity of the inner middle land portion 6$i$ is increased to enhance the steering stability.

In view of securing a sufficient drainage property while retaining the rigidity of the inner middle land portion 6$i$, the width GW4 of the middle lateral grooves 9 is preferably at least 0.5%, more preferably at least 1.0%, of the tread width TW and, as to the upper limit, is preferably at most 3.5%, more preferably at most 3.0%, of the tread width TW. In particular, it is preferable to optimize the rigidity of the middle blocks 16 by gradually decreasing the groove width toward the tire equator C side at which the ground contact pressure is high, as shown in this embodiment, thereby contemplating prevention of uneven wear and enhancement of steering stability. Similarly, it is preferable that the depth of the middle lateral grooves 9 is 3.0 mm or more, especially 3.5 mm or more, and is 8.0 mm or less, especially 7.5 mm or less.

Figure 7A:
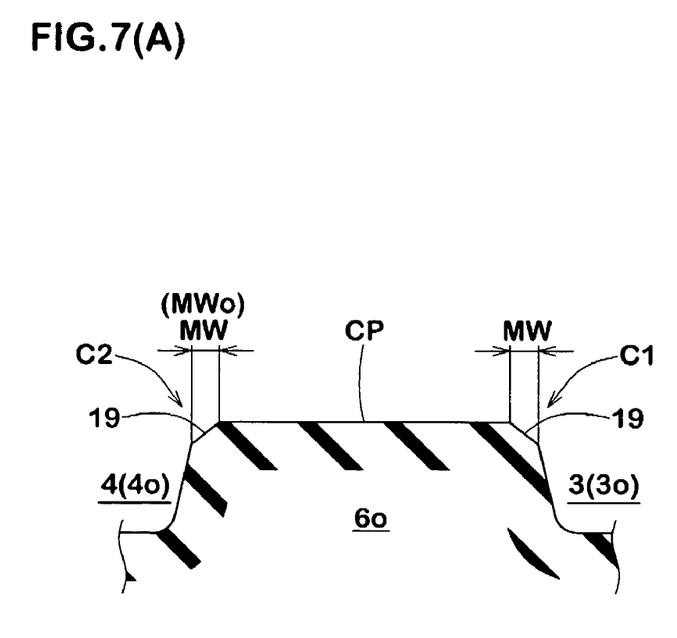
FIG. 7(a) is a cross sectional view of an outer middle land portion.
Figure 7B:
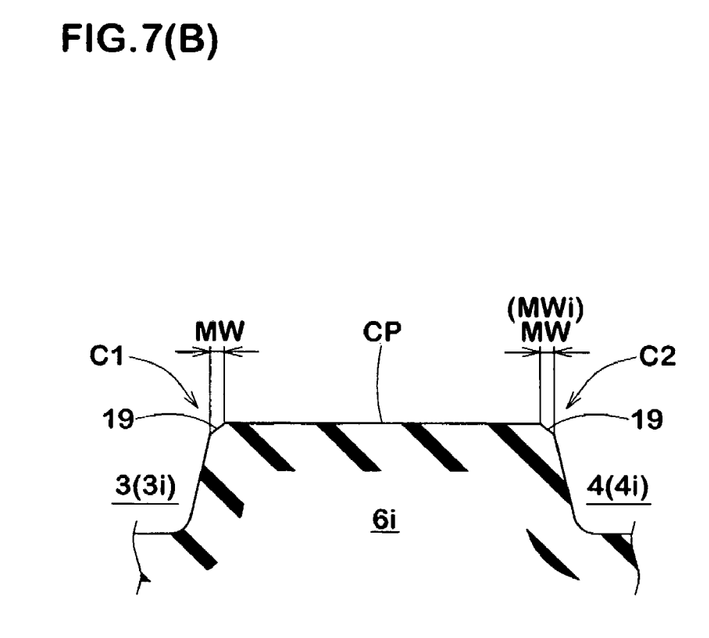
FIG. 7(b) is a cross sectional view of an inner middle land portion.

FIGS. 7(A) and 7(B) show cross section views of the outer middle land portion 6$o$ and the inner middle land portion 6$i$, respectively. In each of the land portions 6$o$ and 6$i$, a corner C1 which is formed by a ground contact surface CP and the crown circumferential groove 3 and which is located on the tire equator C side, and a corner C2 which is formed by the ground contact surface CP and the shoulder circumferential groove 4 and which is located on the ground contact edge side, are removed to provide slanting surfaces 19. That is to say, the circumferentially extending edges of each of the outer and inner middle land portions 6$o$ and 6$i$ have chamfers 19. Such circumferentially continuous chamfers 19 serve to enhance the rigidity of the corners C1 and C2 of the middle land portions 6 to effectively prevent generation of rubber chipping and uneven wear.

The axial width MW of the chamfers 19 is not particularly limited. However, if the width MW is too small, the uneven wear-preventing effect is not sufficiently obtained, and if the width MW is too large, the ground contact area of the middle land portions 6 is decreased, so the steering stability tends to deteriorate. Therefore, it is preferable that the width MW is 0.5 mm or more, especially 1.0 mm or more, and is 2.5 mm or less, especially 2.0 mm or less.

Since a large load or lateral force acts on the outer middle land portion 6$o$ during cornering as compared with the inner middle land portion 6$i$, uneven wear is easy to occur particularly at the corners C1 and C2 of the outer middle land portion 6$o$. Therefore, when chamfers 19 are formed so that the axial width MW of the chamfers 19 of the outer middle land portion 6$o$ is larger than that of the chamfers 19 of the inner middle land portion 6$i$, the rigidity of the corners C1 and C2 of the outer middle land portion 6$o$ is enhanced to realize uniform wear over the entire of tread portion 2. From such a point of view, it is preferable that the ratio of the width MWo of the chamfers of the outer middle land portion 6$o$ to the width MWi of the chamfers of the inner middle land portion 6$i$ (MWo/MWi ratio) is from about 1.5 to about 3.0, especially about 2.0 to about 2.5.

The shoulder land portion 7 comprises an inner shoulder land portion 7$i$ located in the inner half tread pattern TPi, and an outer shoulder land portion 7$o$ located in the outer half tread pattern TPo.

In the inner shoulder land portion 7$i$, inner shoulder lateral grooves 10$i$ which extend between the inner shoulder circumferential groove 4$i$ and the tread ground contact edge Ei to connect them are disposed at intervals in the circumferential direction, whereby the inner shoulder land portion 7$i$ is formed as a block row wherein shoulder blocks 17 align in the circumferential direction.

In this embodiment as shown in FIG. 1, the inner shoulder lateral grooves 10$i$ are disposed at approximately regular intervals. The circumferential interval (or pitch) between the adjacent grooves 10$i$ is substantially half of the interval or pitch of the middle lateral grooves 9. The inner shoulder lateral groove 10$i$ obliquely extends from a location at which the inner shoulder lateral groove 10$i$ is smoothly connected with the middle lateral groove 9 through the inner shoulder circumferential groove 4$i$, to the inner ground contact edge Ei of the tread in the same oblique direction as the middle lateral groove 9. Such inner shoulder lateral grooves 10$i$ serve to smoothly discharge axially outwardly (to outside of the inner ground contact edge Ei) a part of water which have flowed from the middle lateral grooves 9 to the inner shoulder circumferential groove 4i, whereby a sufficient drainage property can be exhibited.

An angle α5 of a straight line connecting the both ends of a groove center line GC5 of the inner shoulder lateral groove 10i with respect to the circumferential direction, as shown in FIG. 6, is preferably at least 70°, more preferably at least 75° and, as to the upper limit, is preferably at most 90°, more preferably at most 85°. In particular, it is preferable that the angle α5 is larger than the angle α4 of the middle lateral groove 9, whereby the lateral rigidity of the shoulder blocks 17 is enhanced.

Outer shoulder lateral grooves 10o are formed in the outer shoulder land portion 7o located between the outer shoulder circumferential groove 4o and the outer ground contact edge Eo of the tread. In this embodiment shown in FIG. 1, the outer should lateral grooves 10o are substantially identical to grooves that the inner shoulder lateral grooves 10i have been symmetrically moved with respect to an arbitrary point on the tire equator C. Also, the groove width and depth of the outer shoulder circumferential groove 4o are substantially the same as those of the inner shoulder circumferential groove 4i.

Figure 8:
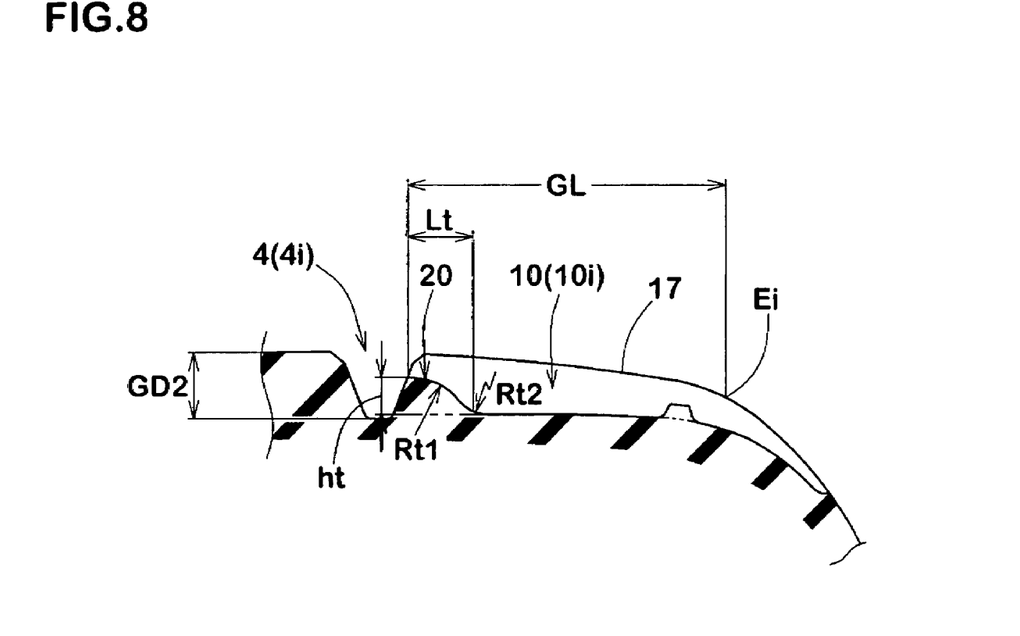
FIG. 8 is a cross sectional view taken on line X-X in FIG. 1.

FIG. 8 is a cross sectional view taken on line X-X in FIG. 1; In the embodiment shown in FIG. 1, each of the shoulder lateral grooves 10 is provided with a tie-bar 20 that the groove bottom rises, on the shoulder circumferential groove 4 side in contact with the wall of the circumferential groove 4. FIG. 8 shows the inner shoulder lateral groove 10i, but the outer shoulder lateral grooves 10o are also provided with tie-bars 20 in the same manner.

The tie-bar 20 connects root portions of adjacent shoulder blocks 17, 17, whereby it serves to enhance the steering stability and the braking performance. The tie-bar 20 also serves to prevent the shoulder block 17 from falling down in the circumferential direction, thereby effectively suppressing a so-called heel/toe wear which is apt to generate at both circumferential edges of each shoulder block 17. Further, since the tie-bar 20 will come into contact with a road surface as the tread portion 2 is worn away, enhancement of grip performance can be expected thereby.

Preferably, sipes 21 extending along the shoulder lateral grooves 10 are previously formed in the tie-bars 20, as shown in FIG. 1, whereby the circumferentially adjacent shoulder blocks 17 can be opened each other to the circumferential direction through each sipe 21 and, for example, the sipes 21 are useful in getting a sufficient traction when running on an unpaved road such as mud road or sand road.

The tie-bars 20 cannot sufficiently exhibit these effects if the height ht or the length Lt along the groove 10 is too small, and the drainage property at the shoulder lateral grooves 10 tends to be deteriorated if the height ht or the length Lt is too large. From such points of view, it is preferable that the height ht of the tie-bars 20 is 50% or more, especially 60% or more, of the groove depth GD2 of the shoulder circumferential groove 4, and is 80% or less, especially 70% or less, of the groove depth GD2. Also, it is preferable that the length Lt of the tie-bars 20 is 10% or more, especially 15% or more, of the groove length GL of the shoulder lateral grooves 10, and is 30% or less, especially 25% or less, of the groove length GL.

Figure 9:
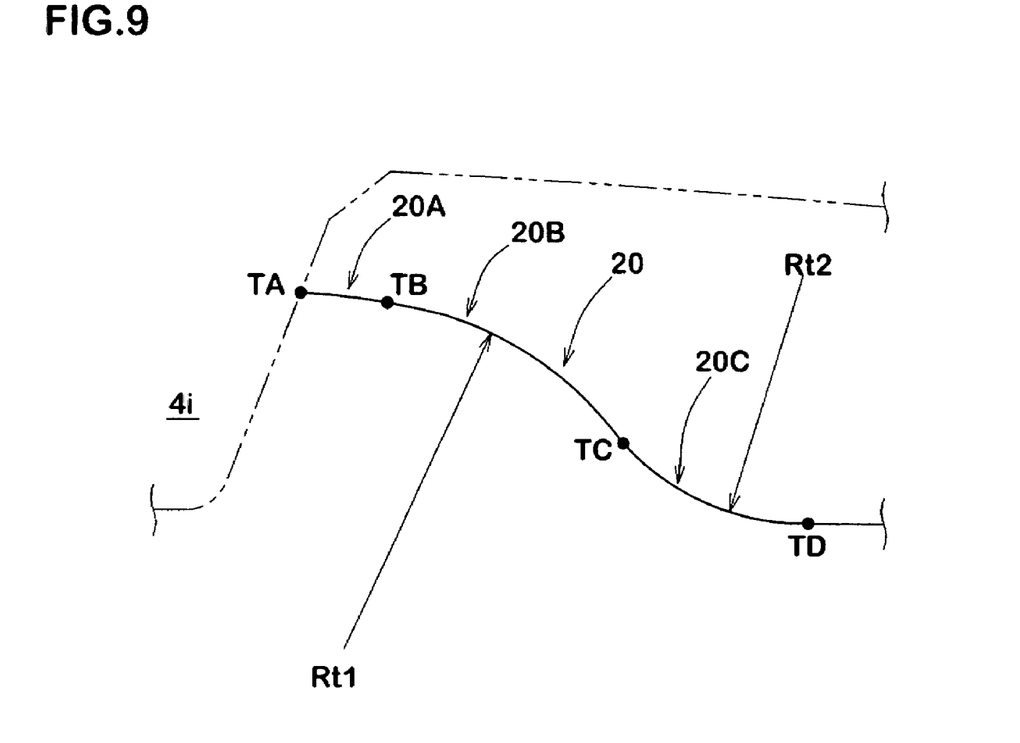
FIG. 9 is a diagram illustrating the contour of the outer surface of a tie bar.

The profile line of the outer surface in section of the tie-bar 20 is shown in FIG. 9. As apparent from the figure, the profile line of the tie-bar 20 includes a first portion 20A which extends in an approximately straight line manner from an inner end TA which opens to the inner shoulder circumferential groove 4i, toward axially outward of the tire up to a point TB, a second portion 20B comprising an arc-like curved portion having a radius of curvature Rt1 which is continuous with the point TB and is convex toward radially outward of the tire in such a manner as gradually decreasing its height ht, and a third portion 20C which is continuous with the second portion 20B at a point TC and extends therefrom to a groove bottom TD to form a curved line having a radius of curvature Rt2 which is convex toward radially inward of the tire. A conventional tie-bar provided in shoulder lateral grooves is of a type such that its ground contact area suddenly increases with wear and, therefore, has the disadvantage that the block rigidity or the like suddenly increases to result in large change of the performances. In contrast, since the tie-bar as shown in this embodiment has a outer surface profile line including a radially outwardly convex arc-like portion so that the height ht of the protuberance (tie-bar) smoothly decreases, the ground contact area of the tie-bar 20 smoothly increases as the tread portion is worn away and, therefore, sudden change in tire performances can be suppressed.

In view of securing a sufficient drainage property while maintaining the rigidity of the shoulder land portions 7, it is preferable that the groove width GW5 of the inner and outer shoulder lateral grooves 10i and 10o is 1.0% or more, especially 2.0% or more, of the tread width TW, and is 4.0% or less, especially 3.0% or less, of the tread width TW. In the same manner, it is preferable that the groove depth of the inner and outer shoulder lateral grooves 10i and 10o is 50% or more, especially 60% or more, of the depth of the shoulder circumferential groove 4, and is 90% or less, especially 80% or less, of the depth of the shoulder circumferential groove 4.

The shoulder land portions 7o and 7i may be provided with sipes, e.g., sipes extending from the sipes 27 disposed in the middle land portions to the ground contact edges through the shoulder circumferential grooves 4o and 4i.

In view of further enhancing the steering stability on a dry road and the drainage property on a wet road, it is preferable to optimize the land ratio of the tread portion 2. For example, it is preferable that the tread portion 2 has a land ratio of 60% or more, especially 62% or more, more especially 64% or more and, as to the upper limit, 70% or less, especially 68% or less, more especially 66% or less. The term "land ratio" as used herein means a proportion of the total ground contact surface of the whole land portions based on the whole surface area of the tread portion 2 (including the area of whole grooves).

In view of enduring large lateral force and load applied in cornering, it is preferable that the outer half of tread portion 2 (outer half tread pattern TPo) occupies at least, 50%, especially more than 50%, more especially at least 51%, of the total surface area of the whole land portions, and is at most 54%, especially at most 53%, more especially at most 52%, of the total surface area of the whole land portions. The inner half of tread portion 2 has a residual land surface area.

While a preferable embodiment of the present invention has been described with reference to the drawings, it goes without saying that the present invention is not limited to only such an embodiment and various changes and modifications may be made.

The present invention is more specifically described and explained by means of the following examples. It is to be understood that the present invention is not limited to these examples.

Examples

Pneumatic tires for passenger cars (size: 225/45ZR17) having a tread pattern shown in FIG. 1 were manufactured based on specifications as described below. Specifications of respective portions common to all tires are as follows:

Tread width: 206.0 mm
Groove width of crown circumferential groove: 10.0 mm
Groove depth of crown circumferential, groove: 8.5 mm
Groove width of shoulder circumferential groove: 9.0 mm
Groove depth of shoulder circumferential groove: 8.5 mm
Groove width of curved oblique groove: 5.0 mm
Groove depth of curved oblique groove: 6.0 mm
Groove width of middle lateral groove: 4.5 mm
Groove depth of middle lateral groove: 6.0 mm
Groove width of shoulder lateral groove: 5.0 mm
Groove depth of shoulder lateral groove: 6.0 mm
Angle $\alpha1$ of curved oblique groove at its starting end: 30°
Angle $\alpha2$ of inner portion of curved oblique groove at intersecting part of curved oblique grooves: 15°
Angle $\alpha3$ of outer portion of curved oblique groove at the intersecting part: 10°
Angle $\alpha4$ of middle lateral groove: 60°
Angle $\alpha5$ of shoulder lateral groove: 80°
Land ratio: 65%

Figure 10A:
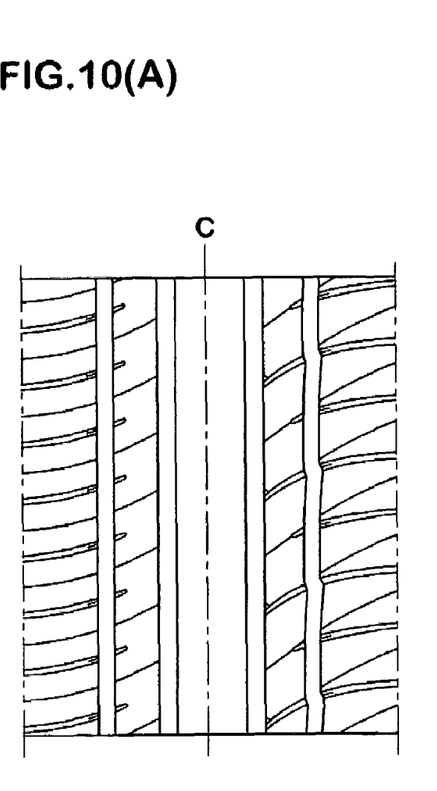
FIGS. 10(A) to 10(C) are plan views illustrating tread patterns used in Comparative Examples described after.
Figure 10B:
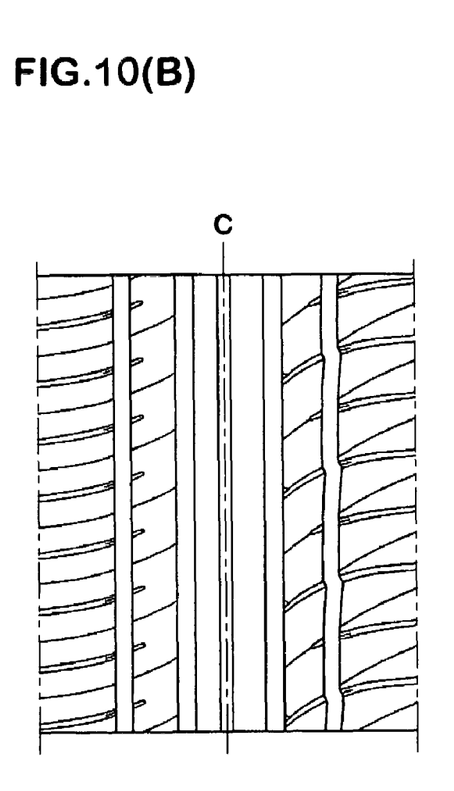
Figure 10C:
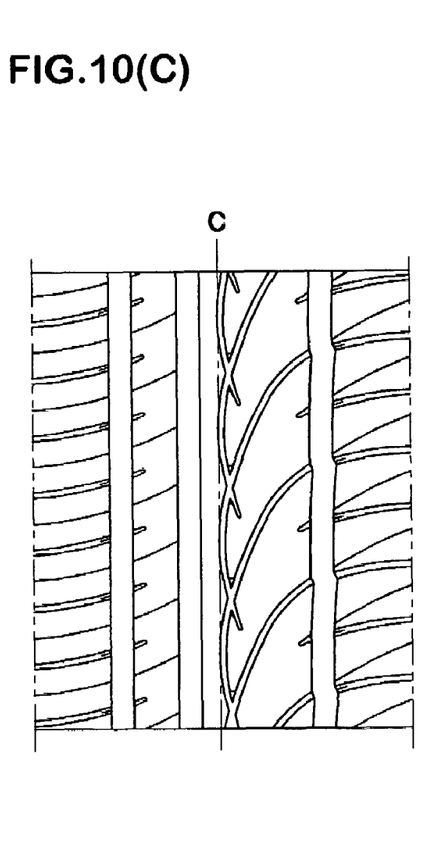

In Comparative Example 1, no groove was formed in the center land portion as shown in FIG. 10(A). In Comparative Example 2, a single straight groove was formed in the center land portion as shown in FIG. 10(B), instead of the curved oblique grooves. In Comparative Example 3, the center land portion and the inner middle land portion were combined into a single land portion as shown in FIG. 10(C). In these comparative examinations, the groove width was adjusted so that the land ratio became the same as that of Example 1.

The steering stability, drainage performance and noise performance of the tires were evaluated by the following methods.

<Steering Stability>

The tires were mounted on each rim (size: 17×7.5 JJ), inflated to an inner pressure of 200 kPa and attached to four wheels of a Japanese 2,500 cc FR passenger car. The car was run on a dry asphalt road under the condition of a single ride, and the handle responsibility in cornering, stiffish feeling and grip characteristics were evaluated by the test driver's feeling. The results are shown as an index based on the result of Comparative Example 1 regarded as 100. The larger the value, the better the steering stability.

<Drainage Performance>

The above-mentioned test car was run on a 100 m radius circular asphalt road provided with a puddle having a depth of 10 mm and a length of 20 m with stepwise increasing the speed for entering into the puddle. The lateral acceleration (lateral G) was measured, and the average lateral G of the front wheel for the speed range of 50 to 80 km/h was calculated. The results are shown as an index based on the result of Comparative Example 1 regarded as 100. The larger the value, the better the drainage performance.

<Noise Performance>

According to an actual car coasting test specified in JASO/C/606 in Japan, the test car was coasted for 50 m distance at a speed of 60 km/h on a straight asphalt test course. The maximum sound level in dB(A) of pass-by noise was measured at the middle point of the test course with a microphone set at 1.2 m height from the asphalt road surface and 7.5 m sideways from the running center line. The results are shown as an index based on the result of Comparative Example 1 regarded as 100. The larger the value, the smaller the pass-by noise.

The results are shown in Table 1.

TABLE 1

| | Com. Ex. 1 | Com. Ex. 2 | Com. Ex. 3 | Ex. 1 |
|---|---|---|---|---|
| Steering stability (index) | 100 | 105 | 100 | 110 |
| Drainage performance (index) | 100 | 105 | 100 | 110 |
| Noise performance (index) | 100 | 95 | 105 | 105 |

It is observed in Table 1 that the steering stability and drainage performance of the tire of Example 1 according to the present invention are significantly improved, the noise performance thereof is also satisfactory.

What is claimed is:

1. A pneumatic tire including a tread portion having an outer ground contact edge and an inner ground contact edge to be located on the outside and inside, respectively, of a vehicle when the tire is fitted to a vehicle, said tread portion provided with a pair of crown circumferential grooves which extend continuously and straightly in the tire circumferential direction and which are disposed one on each side of the tire equator to provide a center land portion between them, wherein said pair of crown circumferential grooves are an inner crown circumferential groove which lies on the inner ground contact edge side of the tire equator and an outer crown circumferential groove which is on the outer ground contact edge side of the tire equator;

an outer shoulder circumferential groove extending continuously in the tire circumferential direction and located between said outer crown circumferential groove and the outer ground contact edge, thereby forming an outer middle land portion between the outer shoulder circumferential groove and said outer crown circumferential groove;

an inner shoulder circumferential groove extending continuously in the tire circumferential direction and located between said inner crown circumferential groove and the inner ground contact edge, thereby forming an inner middle land portion between the inner shoulder circumferential groove and said inner crown circumferential groove; and a plurality of curved oblique grooves provided in said center land portion at intervals in the tire circumferential direction, wherein each said curved oblique groove extends obliquely from said inner crown circumferential groove toward said outer crown circumferential groove over the tire equator and turns, without reaching said outer crown circumferential groove, toward said inner crown circumferential groove and extends obliquely intersecting one of the curved oblique grooves to define an intersecting point at a location substantially on the tire equator and terminates at a location between the inner crown circumferential groove and the tire equator in said center land portion, whereby each of the curved oblique grooves is composed of:
an outer component which lies on the outer ground contact edge side of the tire equator,
a first inner component which lies on the inner ground contact edge side of the tire equator and located on one side of the outer component in the tire circumferential direction, and
a second inner component which lies on the inner ground contact edge side of the tire equator and located on the other side of the outer component in the tire circumferential direction, and said outer and inner middle land portions each having circumferentially extending edges provided with chamfers such that the chamfers of the outer middle land portion are larger in the axial width than the chamfers of the inner middle land portion.

2. The pneumatic tire of claim 1, wherein said center land portion has a center rib extending continuously and circumferentially of the tire and defined between said outer crown circumferential groove and arc portions of said curved oblique grooves, each defined as extending between the intersecting points of said curved oblique grooves, the axial width of the center rib repeating increase and decrease in the tire circumferential direction, and the ratio of maximum axial width/minimum width of said center rib is from 1.4 to 1.6.

3. The pneumatic tire of claim 2, wherein said inner middle land portion is provided with lateral grooves and thereby divided into a plurality of blocks whereas said outer middle land portion is not provided with lateral grooves extending across the entire width thereof.

4. The pneumatic tire of claim 1, wherein
said inner middle land portion is provided with lateral grooves and thereby divided into a plurality of blocks whereas said outer middle land portion is not provided with lateral grooves extending across the entire width thereof.

5. The pneumatic tire of claim 4, wherein said lateral grooves provided in said inner middle land portion have a width gradually decreasing toward the tire equator.

6. The pneumatic tire of claim 1, wherein said inner shoulder circumferential groove extends circumferentially in a zigzag form having an amplitude of 0.5 to 2.0 mm.

7. The pneumatic tire of claim 1, wherein said outer shoulder circumferential groove is a straight groove.

8. The pneumatic tire of claim 1, wherein said inner shoulder circumferential groove extends circumferentially in a zigzag form having an amplitude of 0.5 to 2.0 mm, and
said outer shoulder circumferential groove is a straight groove.

9. The pneumatic tire of claim 1, wherein the curved oblique grooves are gradually decreased in the width from their ends at the inner crown circumferential groove to their terminal ends.

* * * * *